B. DYMOND.
BEARING FITTING TOOL.
APPLICATION FILED AUG. 15, 1919.
1,383,454.
Patented July 5, 1921.
2 SHEETS—SHEET 1.
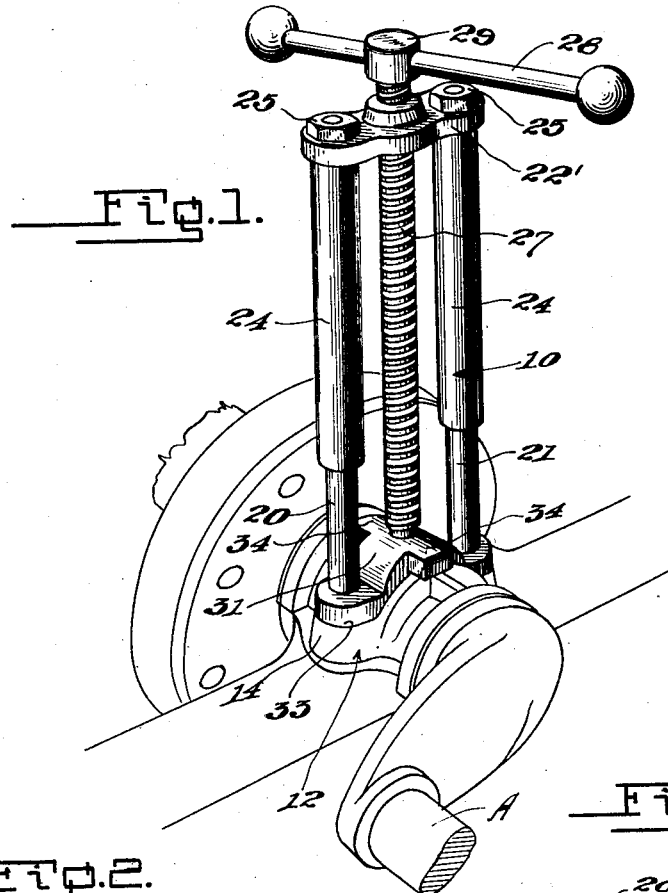
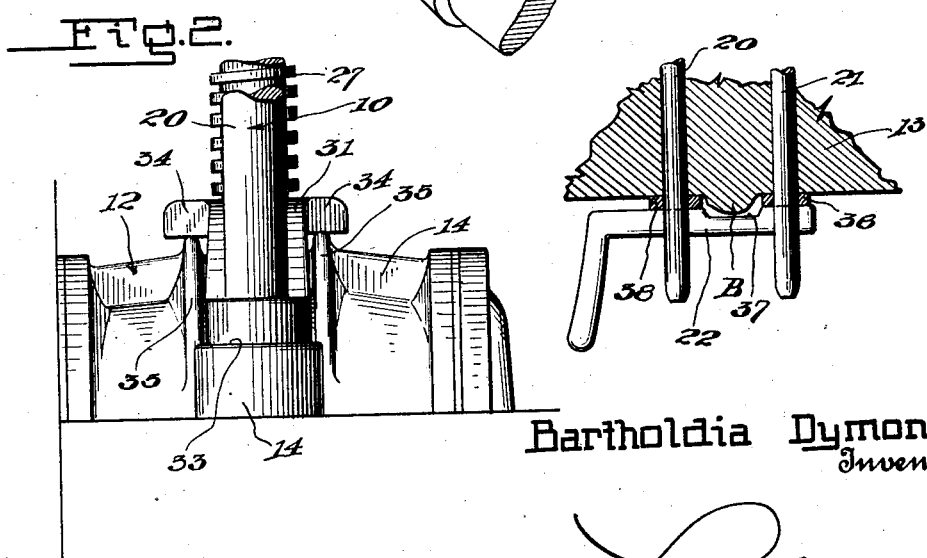
Bartholdia Dymond
Inventor

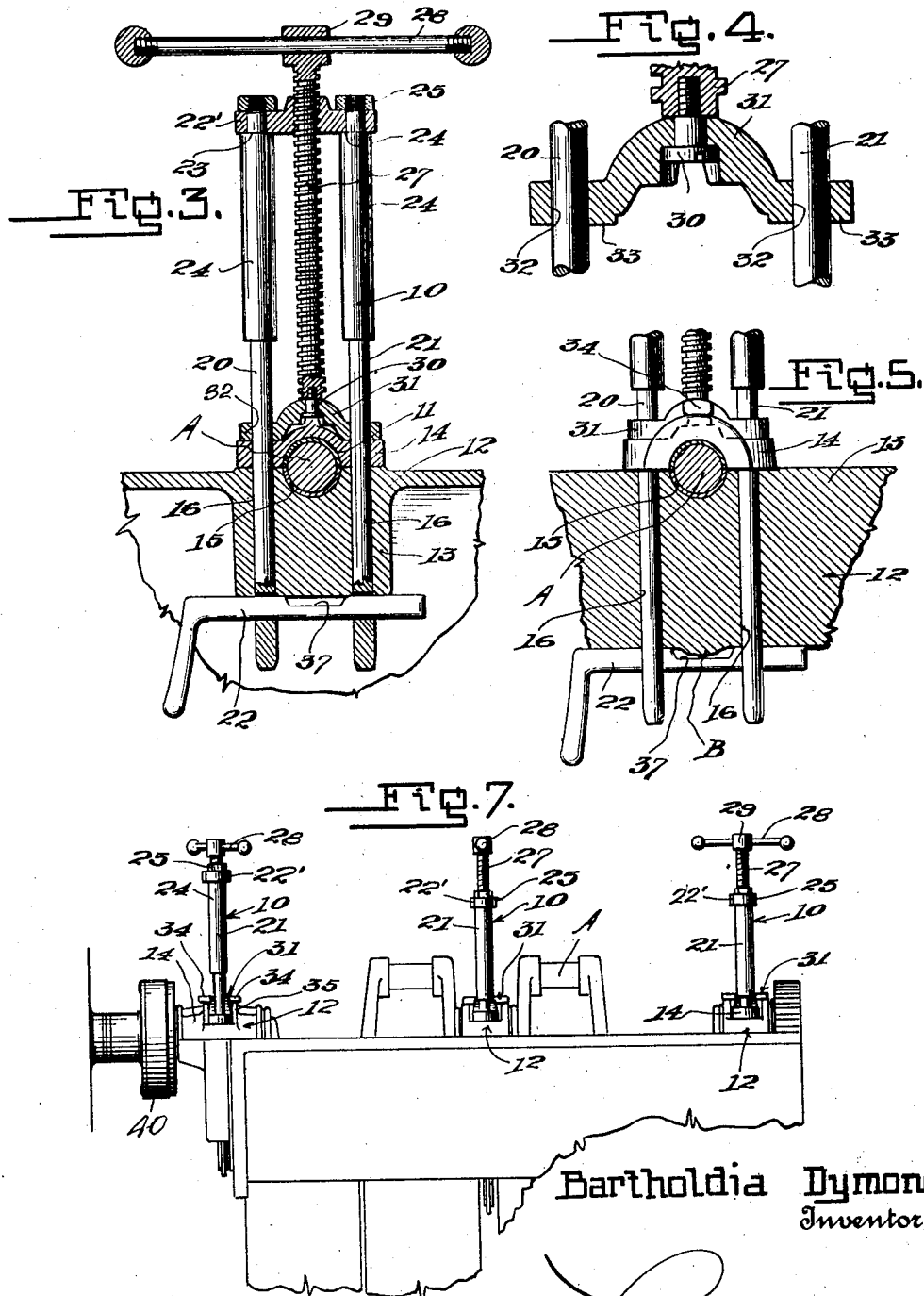

UNITED STATES PATENT OFFICE.

BARTHOLDIA DYMOND, OF CHARLOTTESVILLE, VIRGINIA.

BEARING-FITTING TOOL.

1,383,454.   Specification of Letters Patent.   Patented July 5, 1921.

Application filed August 15, 1919. Serial No. 317,775.

*To all whom it may concern:*

Be it known that I, BARTHOLDIA DYMOND, a citizen of the United States, residing at Charlottesville, in the county of Albemarle and State of Virginia, have invented certain new and useful Improvements in Bearing-Fitting Tools, of which the following is a specification.

This invention relates to a tool, which is particularly designed for fitting "Babbitt-metal" bearings or linings in bearings of various types of shafts, and an object of the invention is to provide a tool by means of which the said bearing linings may be worn or shaped to properly fit the shaft which is rotatably mounted therein, without the necessity of scraping the bearings or cutting them down to properly fit the shaft.

The pressure method of truing bearing linings is sometimes resorted to, but considerable difficulty is experienced in the present manner of utilizing this method of truing the bearings owing to the difficulty in properly engaging and turning at the proper intervals the bolts which clamp the bearing caps upon the pillow blocks of the bearing, and an object of this invention is to provide a tool structure which may be applied to the bearing boxes, being connected thereto by means of an opening inclined for receiving the attaching bolt, which tool includes a pressure member having four time contacts with the bearing cap, and also to associate means with the pressure member, gradually forcing it downwardly, to gradually force the bearing cap into engagement with the body or pillow block of the bearing, exerting pressure upon the pillow or lining of suitable soft metal, such as "Babbitt-metal" or the like and during which time the shaft is rotating in the bearing, wearing upon this soft metal liner, in proportion with the pressure applied thereto, and gradually wearing down the liner to properly fit the shaft, after which proper lubrication is applied which eliminates to a material extent further wear upon the bearing liner, during the rotation of the shaft therein.

Other objects of the invention will appear in the following detailed description taken in connection with the accompanying drawings, forming a part of this specification, and in which drawings:

Figure 1 is a perspective view of the improved tool showing it applied.

Fig. 2 is a detail view of the tool showing its manner of engagement with the cap of a bearing structure.

Fig. 3 is a cross section through a bearing structure showing the fitting tool applied thereto.

Fig. 4 is an enlarged detailed section through the pressure member of the tool.

Fig. 5 is a section similar to Fig. 3, illustrating the application of the tool to a different part of a motor casing, such as used in motor vehicles.

Fig. 6 is a view similar to Fig. 5 showing the application of the tool to still another part of a motor casing, and Fig. 7 is a side elevation of a crank shaft such as used upon a motor vehicle, showing it mounted, and the improved bearing fitting tools connected thereto, for fitting the bearing lining of the crank shaft.

Referring more particularly to the drawings, wherein like characters indicate like and corresponding parts throughout the several views, the crank shaft A of motors, such as a "Ford" motor used upon motor vehicles, is shown, and the improved bolt fitting tool 10 is illustrated in the drawings, as employed for properly fitting the bearing linings 11 and 15 of the bearing structure 12, of the crank shaft A.

The bearings 12, include the usual pillow block or supporting body 13, and the cap 14 in which the linings 11 and 15, of "Babbitt-metal" or analogous soft metal is placed to form a bearing for the shaft A during the operation of the motor.

In truing or fitting the bearing linings 11 and 15, the soft metal is poured in the bearing in the usual manner, and the supporting rods or guides 20 and 21 of the tool 10 are inserted through the openings 16 in the bearing structure 12 which openings normally receive bolts for attaching the cap 14 to the body 13 of the bearing structure, and these guides 20 and 21 are locks connected to the bearing structure 12 by a transverse key 22 which extends through openings in the guides near their lower ends. A head plate 22' is mounted upon the upper end of the guide rods 20 and 21, and is held thereon by engagement against the shoulders 23 formed at the upper edge of the enlarged intermediate portions 24 of the guide rods, and nuts 25 which are mounted upon the upper threaded terminals of these guide rods 20 and 21. A feed screw 27 is adjustably carried by the head plate 22', and it has an operating rod 28 extending through the head 29 thereof. The feed screw 27 extends through a threaded bore in the head plate or block 22' and its lower end is connected by means of a set screw 30 with a pressure member or block 31. The pressure block 31 is provided with openings 32, through which the guide rods 20 and 21 extend and it is provided with flat surfaces 33 at each end, shaped to firmly fit against the nut or bolt head engaging surface of the bearing cap 14 and with laterally extending projections 34 which engage on the highest point of the ribs 35 which are formed upon the cap 14 of the bearing boxes of various types of motors, thereby providing a full point contact between the pressure block 31 and the bearing cap 14, so that when the pressure block 31 is formed downwardly by rotation of the feed screw 27, the bearing cap or head 14 may be gradually forced downwardly therewith and the pressure will be substantially equally distributed over the bearing cap to properly apply the pressure to the soft metal bearing lining so that wear thereon by rotation of the shaft A will be distributed in such manner that after the cap 14 has been moved into engagement with the adjacent surface of the body 13 in the bearing 12, the shaft A will properly fit in the bearing linings 11 and 15 and upon lubricating thereof, a true bearing will be provided for the shaft A and the necessity of scraping or cutting the bearing lining will be eliminated, permitting the proper fitting of the bearing lining in much less time than in the usual manner of scraping and marking the bearing lining to obtain the proper fit. It is of course understood that during the fitting operation, no lubricating oil is applied to the bearings, so that the rotation of the shaft A by any suitable means, and the pressure applied to the soft metal lining through the medium of the feed screw 27 and pressure block 31 will cause the bearing lining to wear away or "burn out" to form a proper fit between the bearing lining and the shaft.

In Fig. 7 of the drawings, three of the bearing fitting tools 10 are shown applied to a "Ford" engine or motor, which when the bearings are properly relined or the linings fitted, the motor is inverted and supported in any suitable manner with the lower portion of the crank casing removed, so as to permit access to the bearings 12 of the crank shaft and if it is so desired, a fitting tool for each bearing may be applied, simultaneously, or only one fitting tool may be employed for fitting the various bearings. Power is applied to the crank shaft A, from any suitable source through a coupling indicated at 40. In the packing of the bearings of "Ford" engines, the metal ribs as indicated at B in Figs. 5 and 6 of the drawings, is generally left upon the portion since it in no wise interferes with the efficient operation of the engine. However, in applying the tool 10 to the bearings for fitting them, it is necessary to cut out a portion of the key 22, as indicated at 37 to accommodate this rough rib. In some instances, the rib is relatively deep as shown at Fig. 6 in the drawings, at which time it is necessary to place washers 28 about the rods 20 and 21 and against the upper surfaces of the key 22 to properly space the key from the bearing body 13.

Changes in details may be made, to accommodate the tool to fit various types of bearings, without departing from the spirit of this invention, but;

I claim:

1. In a bearing fitting tool, the combination, of a pair of guide and attaching rods provided with openings extending therethrough near their lower ends, a locking key extending through said openings, a pressure member carried by said rods and means for moving said pressure member into and out of pressing position.

2. In a bearing fitting tool, the combination, of a pair of guide and attaching rods provided with openings extending therethrough near their lower ends, a locking-key extending through said openings, a pressure member carried by said rods, means for moving said pressure member into and out of pressing position, and laterally extending projections formed upon said pressure member for engagement with the upper surface of a bearing cap.

3. A bearing fitting tool comprising a pair of guiding and attaching rods, the lower ends of said rods being reduced in diameter and provided with diametrically extending slots, keys arranged to fit in said slots, a head carried by the upper ends of said rods, a feed screw carried by said head, means whereby the feed screw may be turned, and a pressure member carried by the feed screw for engaging a bearing cap, said pressure member having openings for the reception of said guide rods.

4. As a new article of manufacture, a bearing fitting tool comprising a frame for attachment with a bearing structure and forming a guide for the companion portion of the bearing structure, and a pressure member carried by the frame for engaging the companion portion of the bearing structure.

5. As a new article of manufacture, a bearing fitting tool comprising a frame including a pair of parallel guide and attaching rods for connection with the bearing structure, a pressure member slidably supported on the rods, the rods forming a guide for the cap of the bearing structure, and means for moving the pressure member into and out of pressing position with the cap.

6. In a device for fitting a bearing bushing, the combination with a bearing structure including a pillow block and cap having alined openings therein, of a pair of parallel rods extending through the openings arranged to form a guide for the cap, means for limiting the movement of the rods in one direction in the openings, and a pressure member carried by the rods arranged to engage the cap.

7. In a device for fitting a bearing bushing, the combination with a bearing structure including a pillow block and a cap having alined openings therein, of a pair of spaced parallel rods extended through the openings, means for connecting the rods and arranged for engagement with one surface of the pillow block to limit the movement of the rods in one direction, the rods forming a guide for the bearing cap, a pressure member slidably supported by the rods and arranged to engage and conform to the configuration of the bearing cap, and adjusting means carried by the rods for moving the pressure member into and out of pressing position with the bearing cap.

BARTHOLDIA DYMOND.